(12) United States Patent
Lentz et al.

(10) Patent No.: US 11,127,109 B1
(45) Date of Patent: Sep. 21, 2021

(54) METHODS AND APPARATUS FOR AVOIDING LOCKUP IN A GRAPHICS PIPELINE

(71) Applicant: Samsung Electronics Co., Ltd., Suwon-si (KR)

(72) Inventors: Derek J. Lentz, Reno, NV (US); Chiachi Chao, Mountain View, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 16/864,143

(22) Filed: Apr. 30, 2020

Related U.S. Application Data

(60) Provisional application No. 62/993,699, filed on Mar. 23, 2020.

(51) Int. Cl.
*G06T 1/20* (2006.01)
(52) U.S. Cl.
CPC .................................... *G06T 1/20* (2013.01)
(58) Field of Classification Search
CPC ........................................................ G06T 1/20
USPC ........................................................ 345/506
See application file for complete search history.

(56) References Cited

U.S. PATENT DOCUMENTS

| | | | |
|---|---|---|---|
| 6,791,559 B2 | 9/2004 | Baldwin | |
| 6,992,669 B2 | 1/2006 | Montrym et al. | |
| 7,737,983 B2 | 6/2010 | Brothers et al. | |
| 9,972,124 B2 | 5/2018 | Lentz et al. | |
| 2003/0169261 A1* | 9/2003 | Emberling | G06T 1/20 345/506 |
| 2003/0179206 A1 | 9/2003 | Emerson et al. | |
| 2004/0085313 A1 | 5/2004 | Moreton et al. | |
| 2007/0091102 A1* | 4/2007 | Brothers | G06F 9/542 345/506 |
| 2007/0139421 A1* | 6/2007 | Chen | G06T 1/20 345/501 |
| 2014/0184617 A1 | 7/2014 | Palmer et al. | |
| 2015/0109293 A1* | 4/2015 | Wang | G06T 15/405 345/422 |
| 2015/0325037 A1* | 11/2015 | Lentz | G06T 15/10 345/419 |
| 2016/0103722 A1 | 4/2016 | Avadhanam | |
| 2016/0379336 A1 | 12/2016 | Tsung et al. | |

(Continued)

*Primary Examiner* — Jacinta M Crawford
(74) *Attorney, Agent, or Firm* — Renaissance IP Law Group LLP

(57) ABSTRACT

A method for avoiding lockup in a graphics pipeline may include accumulating position information in an accumulating stage of the pipeline, passing position information from a first preceding stage of the pipeline to the accumulating stage, determining a condition in the first preceding stage, and draining accumulated position information from the accumulating stage in response to the condition in the first preceding stage. The method may further include passing position information from the first preceding stage to a second preceding stage of the pipeline, passing position information from the second preceding stage to the accumulating stage, determining a condition in the second preceding stage, and draining accumulated position information from the accumulating stage in response to the condition in the first preceding stage and the condition in the second preceding stage.

20 Claims, 4 Drawing Sheets

(56) References Cited

U.S. PATENT DOCUMENTS

2019/0096024 A1    3/2019  Ray et al.
2020/0202594 A1*   6/2020  Saleh ..................... G06T 11/40

* cited by examiner

METHODS AND APPARATUS FOR AVOIDING LOCKUP IN A GRAPHICS PIPELINE

CROSS-REFERENCE TO RELATED APPLICATION

This application claims priority to, and the benefit of, U.S. Provisional Patent Application Ser. No. 62/993,699 titled "Primitive and Rasterization Accumulation Deadlock Avoidance" filed Mar. 23, 2020 which is incorporated by reference.

TECHNICAL AREA

This disclosure relates generally to graphics processing, and specifically to methods and apparatus for avoiding lockup in a graphics pipeline.

BACKGROUND

A graphics processing unit (GPU) may include a pipeline having a sequence of stages that may perform a series of operations to render an image. To improve efficiency and/or performance, a graphics pipeline may include one or more stages that may attempt to eliminate coverage of primitives within an image to reduce the amount of work that must be performed by a subsequent pixel shading stage. This type of stage, which may eliminate coverage by merging and/or discarding coverage, may accumulate coverage information in a storage structure associated with the stage.

SUMMARY

A method for avoiding lockup in a graphics pipeline may include accumulating position information in an accumulating stage of the pipeline, passing position information from a first preceding stage of the pipeline to the accumulating stage, determining a condition in the first preceding stage, and draining accumulated position information from the accumulating stage in response to the condition in the first preceding stage. The condition in the first preceding stage may include a blocked condition. The method may further include passing position information from the first preceding stage to a second preceding stage of the pipeline, passing position information from the second preceding stage to the accumulating stage, determining a condition in the second preceding stage, and draining accumulated position information from the accumulating stage in response to the condition in the first preceding stage and the condition in the second preceding stage. The condition in the second preceding stage may include a blocked condition; and the condition in the first preceding stage may include a not busy condition. The first preceding stage may include a position information culling stage, and the second preceding stage may include a rasterization stage. A decision to drain accumulated position information from the accumulating stage may be centralized based on information from the first and second preceding stages. A decision to drain accumulated position information from the accumulating stage may be distributed between the first and second preceding stages. The accumulating stage may include one of a coverage merge stage or a coverage discard stage. The position information accumulated by the accumulating stage may include at least one of rasterization coverage, a primitive, a vertex, or control information. The first preceding stage may include one of a front end output storage buffer, a front end shader output logic stage, a clip cull viewport stage, a rasterization setup stage, or an attribute setup stage.

An apparatus may include a graphics pipeline including an accumulating stage configured to accumulate position information, a first preceding stage configured to send position information to the accumulating stage, and force drain logic configured to determine a condition in the first preceding stage and force the accumulating stage to draining accumulated position information in response to the condition in the first preceding stage. The condition in the first preceding stage may include a blocked condition. The pipeline may further include a second preceding stage configured to receive position information from the first preceding stage and pass position information to the accumulating stage, and the force drain logic may be configured to determine a condition in the second preceding stage and force the accumulating stage to drain accumulated position information in response to the condition in the first preceding stage and the condition in the second preceding stage. The condition in the second preceding stage may include a blocked condition, and the condition in the first preceding stage may include a not busy condition. The first preceding stage may include a position information culling stage, and the second preceding stage comprises a rasterization stage.

An apparatus may include a graphics pipeline including a rasterization circuit, an accumulating circuit coupled to the rasterization circuit, wherein the accumulating circuit is capable of accumulating coverage received from the rasterization circuit and draining at least a portion of the coverage in response to a force drain signal, an upstream circuit coupled to the rasterization circuit to send position information to the rasterization circuit, and a force drain circuit coupled to the rasterization circuit, the accumulating circuit, and the upstream circuit wherein the force drain circuit is capable of generating the force drain signal in response to a drain request signal from the upstream circuit and a status signal from the rasterizer circuit. The force drain circuit may assert the force drain signal in response to the upstream circuit asserting the drain request signal and the status signal indicating the rasterization circuit is not busy. At least a portion of the force drain circuit may be integral with at least one of the upstream circuit or the rasterization circuit. The accumulating circuit may include one of a coverage merge circuit or a coverage discard circuit. The upstream circuit may include one of a front end output storage buffer, a front end shader output logic stage, a clip cull viewport stage, a rasterization setup stage, or an attribute setup stage.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Some embodiments of a GPU according to this disclosure may include a pipeline having one or more accumulating stages that may attempt to reduce the amount of work performed by a downstream pixel shader by, for example, merging coverage (e.g., quad merge) and/or discarding coverage (e.g., early coverage discard). An accumulating stage may receive a stream of rasterized coverage information from a preceding rasterization stage and retain this coverage information in a data accumulating structure to enable it to perform its function.

The rasterization stage may generate the coverage information in response to a stream of primitives sent to it by one or more additional preceding stages which may include front end shaders (e.g., vertex shaders), front end output logic, culling stages, setup stages, and/or the like. Anything that blocks the flow of primitives, rasterization coverage, and/or other information through the pipeline may result in pipeline lockup (which may also be referred to as deadlock). For example, one or more of the preceding stages may include storage for attributes of primitive vertices. If the attribute storage for a stage fills up, it may interrupt the flow of primitives to the rasterization stage, thereby causing lockup.

Some embodiments according to this disclosure may include force drain logic which may avoid lockup by forcing an accumulating stage to drain some or all of its accumulated data in response to determining that a lockup condition is or may be occurring in the pipeline. For example, in some embodiments, one or more of the preceding stages may assert a drain request signal if it determines that the stage is or may be blocked. The force drain logic may use one or more drain request signals from one or more preceding stages, and/or other information such as status information from one or more preceding stages, to decide whether to drain accumulated data in the accumulating stage.

Figure 1:
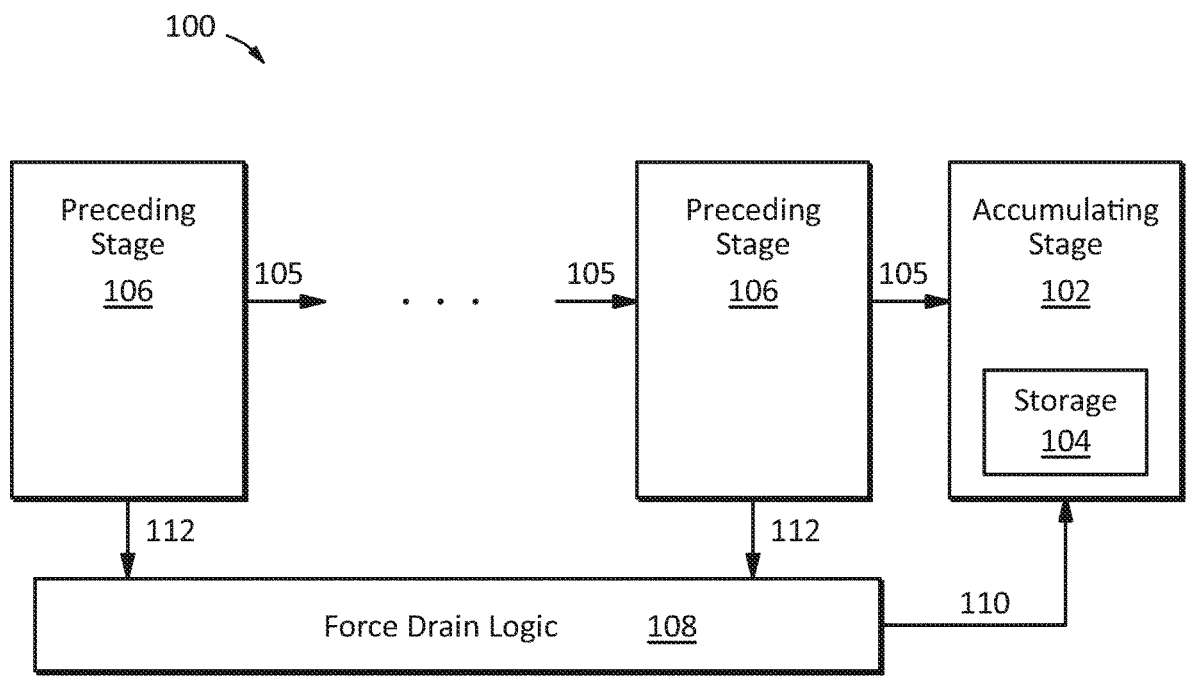
FIG. 1 illustrates an embodiment of a graphics pipeline according to this disclosure.

FIG. 1 illustrates an embodiment of a graphics pipeline according to this disclosure. The pipeline 100 illustrated in FIG. 1 may include an accumulating stage 102 which may be capable of accumulating position information in a data accumulating (storage) structure 104. In some embodiments, the position information may include primitive information, rasterization coverage, control information, and/or the like. The accumulating stage may be implemented with one or more stages of any type that may perform any pipeline related function involving accumulating position information. For example, in some embodiments, the accumulating stage may be implemented with a coverage reduction stage such as a merging stage which may attempt to reduce work performed by a downstream pixel shader by merging partially covered blocks of fragments or pixels. Another example of a coverage reduction stage that may be used is a discard stage in which overlapping coverage may be erased to remove blocks of fragments or pixels. Since these types of stages may reduce coverage by erasing or merging earlier coverage, they may retain coverage in the data accumulating structure 104, for example, until new coverage pushes old coverage out, or a state change causes old coverage to be pushed out. The data accumulating structure 104 may be implemented with any suitable data storage, for example, random access memory (RAM), registers in a register file, registers outside of a register file, first-in, first-out (FIFO) memory, buffers, queues, and/or the like.

The pipeline 100 may also include any number of preceding stages 106 that may perform various pipeline functions such as shading, culling and/or view clipping, rasterization setup, attribute setup, rasterization, depth testing, and/or the like. These stages may transform and/or pass various types of information through the pipeline in a sequential and/or parallel manner. For example, in some embodiments, position information 105 such as vertex position information, primitives, control information, and/or the like may pass through a position information path formed by a Clip Cull Viewport (CCV) stage, a rasterization setup stage, a rasterization stage, and/or a depth test stage. In these embodiments, attribute information such as vertex attributes may pass through an attribute path which may include one or more buffers, an attribute setup stage, and/or other storage structures that may be separate from, overlapping with, integral with, and/or associated with, any of the stages in the position information path.

The pipeline 100 may also include force drain logic 108 which may force the data accumulating stage 102 to drain some or all of its accumulated data based on one or more conditions in one or more of the preceding stages 106, for example, by asserting a force drain signal 110. The force drain logic 108 may determine conditions in a preceding stage, for example, by monitoring information 112 such as a drain request signal, a status signal, and/or any other information from any of the preceding stages. For example, a preceding stage may assert a drain request signal if it determines that the stage is or may be blocked. Additionally, or alternatively, a preceding stage may provide a status signal that may indicate, for example, whether the stage is busy or not busy.

The force drain logic 108 may use one or more drain request signals and/or status signals from one or more preceding stages, and/or any other information that may enable the force drain logic 108 to evaluate conditions in the pipeline and decide whether to drain accumulated data from the accumulating stage to avoid lockup. The force drain logic may not necessarily drain accumulated data in response to every drain request. For example, if a CCV stage asserts a drain request signal, but a rasterization stage downstream of the CCV stage is busy rasterizing one or more primitives, draining accumulated data in the accumulating stage 102 may not be required because coverage passed to the accumulating stage may result in the accumulation stage draining coverage naturally, and therefore, the force drain logic 108 may decide not to drain accumulated data from the accumulating stage.

In some embodiments, the force drain logic 108 may operate on an underlying principle that, if the accumulating stage 102 is prevented from receiving coverage from a preceding rasterization stage, then it may not pass coverage to a subsequent stage (e.g., a pixel shader), and this, in turn, may prevent resources from being freed in one or more earlier stages. In general, if any primitives are able to be passed down the pipeline to a rasterization stage, or if one or more primitives are being rasterized at any given time, a force drain may not be needed. However, if coverage is blocked from passing down through the pipeline, coverage may not be able to reach the accumulating stage 102, and this may prevent the accumulating stage 102 from draining coverage for consumption by a subsequent stage (e.g., a pixel shader). This may prevent the subsequent stage from draining attribute data which may cause one or more earlier stages to become blocked, thereby resulting in lockup.

In some embodiments, the per-stage logic may operate as follows:

If a stage is prevented from passing primitives and/or coverage to the next stage, it may send a drain request to the next stage.

If a stage is idle and it receives a drain request from a preceding stage, it may pass the drain request to the next stage.

If a rasterizer stage cannot generate coverage and the pipeline between the rasterizer and the accumulation stage contains no coverage, the force drain request may be passed to the accumulation stage.

If the accumulation stage receives a force drain request from a rasterization stage, unless it is blocked by a later pipeline stage, it may begin drain coverage until either the force drain request is de-asserted or its accumulation storage is empty.

In some embodiments, the accumulating stage 102 may include a timeout counter that may operate as a fail-safe mechanism by counting how long its coverage input has been idle, and initiating an internal force drain operation.

In some embodiments, the force drain logic 108 may be implemented to make decisions in a centralized manner based on information 112 received from preceding stages 106 as shown in FIG. 1. In some other embodiments, the force drain logic 108 and/or its decision making functions may be implemented in a distributed manner as shown in FIG. 2, which illustrates another embodiment of a graphics pipeline 116 according to this disclosure.

Figure 2:
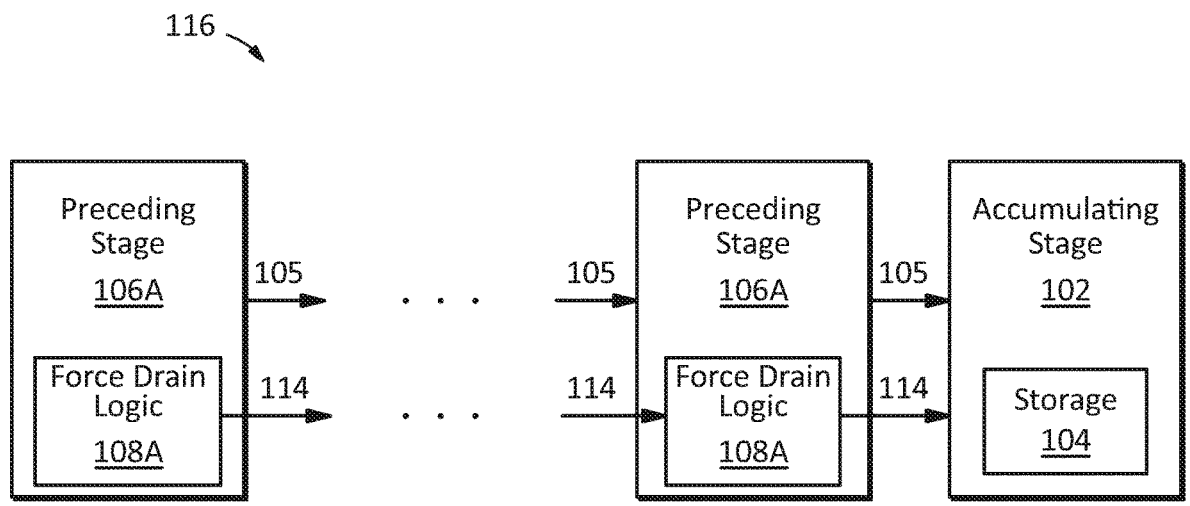
FIG. 2 illustrates another embodiment of a graphics pipeline according to this disclosure.

Referring to FIG. 2, one or more of the preceding stages 106A may include force drain logic 108A which may look for a drain request signal 114 from a preceding stage. In some embodiments, the force drain logic 108A at each preceding stage may operate according to the following logic equation:

$$\text{Drain-Req-Out} = (\text{Drain-Req-In} \ \& \ (!\text{Local-Busy})) | \text{Local-Blocked} \quad (\text{Eq. 1})$$

where "&" is the logical AND operator, "!" is the logical NOT operator, "|" is the logical OR operator, "Drain-Req-Out" is the state of the local stage's drain request output signal (asserted to send a drain request to the next stage), "Drain-Req-In" is the state of the local stage's drain request input signal (asserted if the previous stage is requesting a force drain), "Local-Busy" means the local stage has primitive or coverage work that can pass out of it to a later pipeline stage, and "Local-Blocked" means that the local stage is prevented from passing primitives and/or coverage to the next stage. In some implementations, this may be analogized to an adder carry chain.

Figure 3:
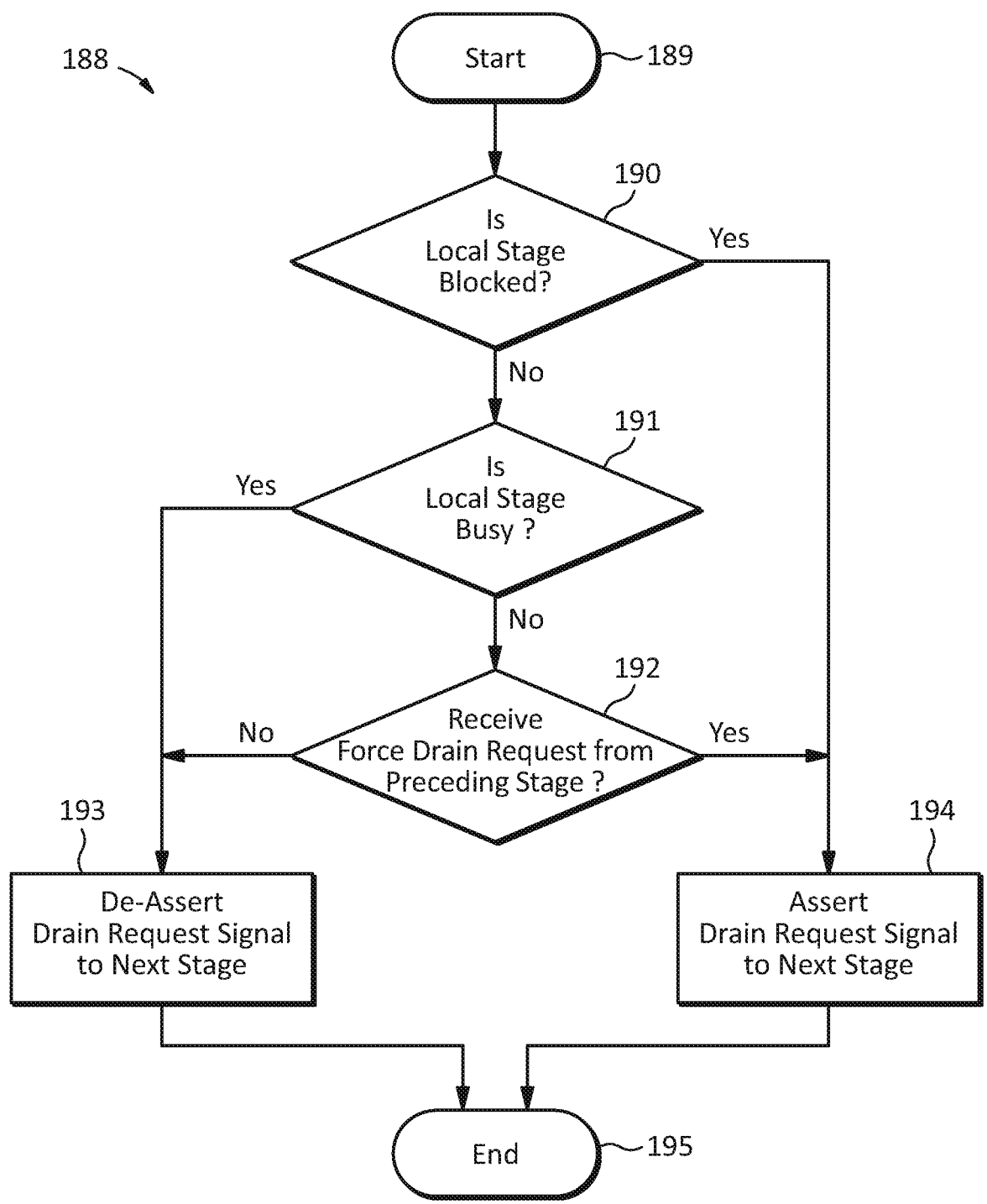
FIG. 3 illustrates an embodiment of a method for implementing per-stage logic according to this disclosure.

FIG. 3 illustrates an embodiment of a method for implementing per-stage logic according to this disclosure. The method 188 may begin at starting point 189 and proceed to operation 190 where the local stage may determine if it is blocked. If the local stage is blocked, the method may proceed to operation 194 where the local stage may assert its drain request signal to the next stage, and the method may end. If, at operation 190, the local stage determines that it is not blocked, the method may proceed to operation 191 where the local stage may determine whether it is busy, e.g., it has primitive or coverage work that can pass out of it to a later pipeline stage. If the local stage is busy, the method may proceed to operation 193 where it may de-assert its drain request signal to the next stage, and the method may terminate at endpoint 195. If, at operation 191, the local stage determines that it is not busy, the method may proceed to operation 192 where the local stage may determine whether a drain request input from a previous stage is asserted. If the drain request input is asserted, the local stage may assert its drain request signal to the next stage at operation 194. Otherwise, the local stage may de-assert its drain request signal to the next stage at operation 193. In some implementations, the operations may be reordered while achieving the same or similar results.

In other embodiments, force drain logic 108 may be implemented as a hybrid combination of centralized and distributed logic.

Some example embodiments of systems, processes, methods, and/or the like illustrating some possible implementation details according to this disclosure are described below. These examples are provided for purposes of illustrating the principles of this disclosure, but the principles are not limited to these embodiments, implementation details, and/or the like.

Figure 4:
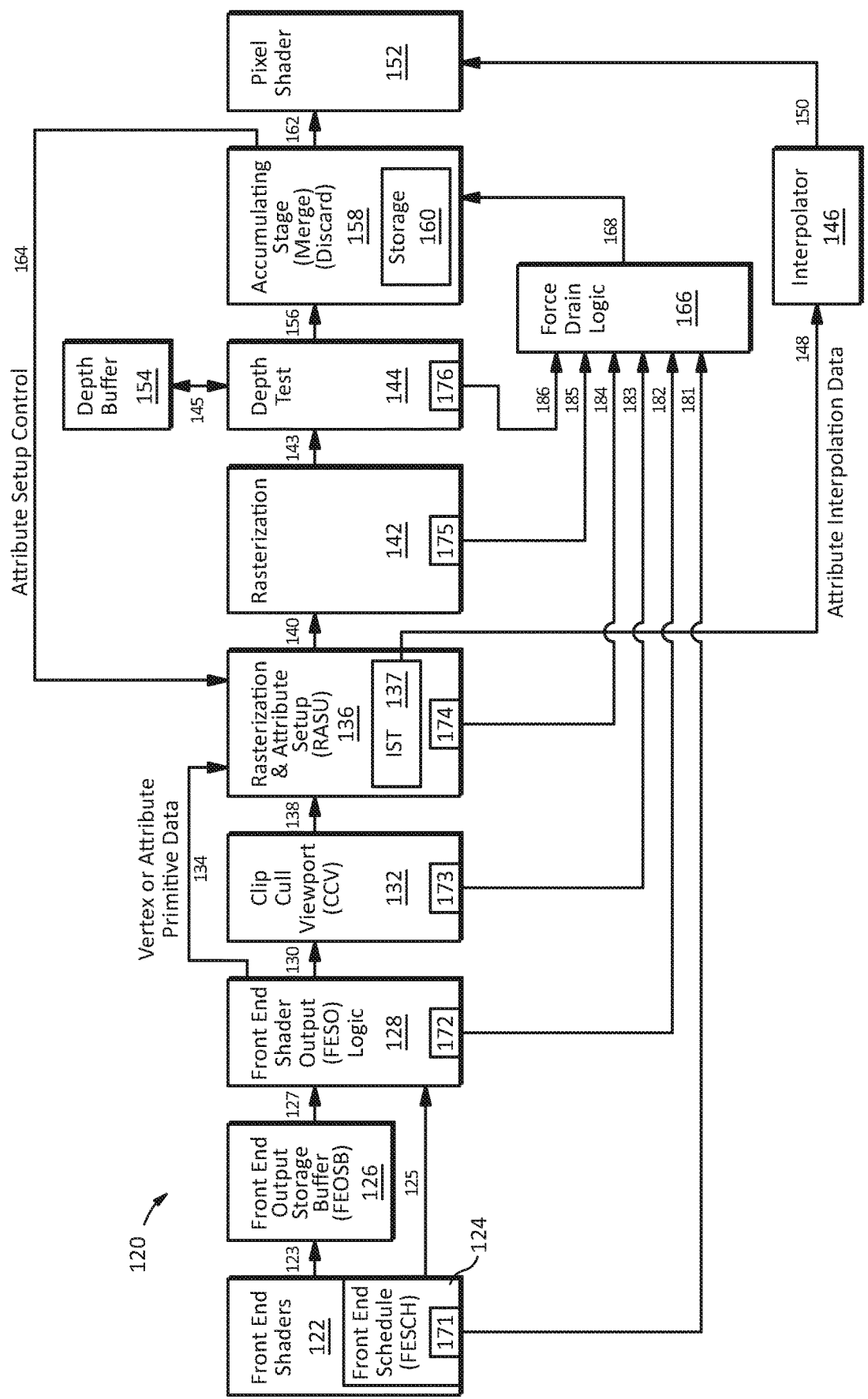
FIG. 4 illustrates an example embodiment of a graphics pipeline according to this disclosure.

FIG. 4 illustrates an example embodiment of a graphics pipeline according to this disclosure. The pipeline 120 illustrated in FIG. 4 may include one or more front end shader stages or circuits 122 which may generate data 123 such as vertex position, attribute, and/or connectivity data that may be stored in a Front End Output Storage Buffer (FEOSB) 126. The one or more front end shader stages 122 may be implemented, for example, as one or more vertex shaders, hull shaders, domain shades, geometry shaders, and/or the like. The FEOSB 126 may be implemented with any suitable data storage structure such as those described above with respect to the data accumulating structure 104.

The pipeline 120 may also include a Front End Shader Output (FESO) logic stage or circuit 128 which, for example, may include hardware to read vertex position and connectivity information from the FEOSB 126 and use this data to form primitives that may be rendered by the pipeline 120. The FESO logic stage 128 may also include hardware to extract vertex attribute information for primitives. The FESO logic stage 128 may extract attribute information before, at the same time as, or after the position information, depending on the implementation details of the pipeline 120.

Front End Scheduling (FESCH) logic 124, which may be separate from and/or integral with one or more of the front end shader stages 122, may provide information 125 to the FESO logic 128 indicating when vertex and/or primitive information (e.g., vertex connectivity) 127 may be extracted from the FEOSB, and/or where to find such information within the FEOSB 126.

In some embodiments, the FESO logic stage 128 may send position and attribute information along different paths through the pipeline. For example, as shown in FIG. 4, position information 130 for vertices and/or primitives may be sent to a CCV stage or circuit 132 which may perform clipping, face culling, and/or viewport transformations, as well as other culling depending on the implementation details. In contrast, attribute information 134 for vertices and/or primitives may bypass the CCV stage 132 and be sent to a Rasterization and Attribute Setup (RASU) stage or circuit 136. In some other embodiments, however, some or all of the attribute data 134 may be passed through the CCV stage 132 to one or more later stages of the pipeline.

Vertices and/or primitives 138, or portions thereof, that may survive the culling operations in the CCV stage 132 may be sent to the RASU stage 136 where vertex position information may be used to compute rasterization setup data 140. For example, the RASU stage may compute edge equations, Z plane equations, and/or bounding boxes for use by a rasterization stage or circuit 142 and/or a depth (Z) test stage or circuit 144. In some cases, specific attribute data such as point size may also be used to compute rasterization setup data.

A further function of the RASU stage 136 may be to perform attribute setup for one or more interpolator units or circuits 146 which may interpolate pixel attributes 150 for use by a pixel shader 152. For example, the RASU stage 136 may use vertex attribute data 134 from the FESO logic stage 128 and some position information 138 from the CCV stage 132 to compute attribute interpolation data 148 such as plane equation coefficients and/or barycentric factors. This attribute setup output may be placed in Interpolation Setup Storage (IST) 137 for later use by the one or more interpolators 146. The IST 137 may be implemented with any suitable data storage structure such as those described above with respect to the data accumulating structure 104. In some embodiments, software interpolation may be used as an alternative to, or in addition to, hardware interpolation.

The rasterization stage 142, which in some embodiments may integrated with, or tightly coupled to, the depth test stage 144, may decompose primitive descriptions into pixel or sample coverage, for example, in the form of a bit mask and location. In some case this coverage 143 may be combined with depth interpolation and, if early depth tests are enabled in the depth test stage 144, used for depth testing primitive depth at pixel or sample points, for example, against values 145 residing in a depth buffer 154. In some implementations, depth may be interpolated in a manner similar to that used by an interpolator 146 for the pixel shader 152. If a depth test fails, the associated coverage may be erased and may not progress down the pipeline.

After rasterization and depth testing, if any, are performed, surviving primitives and/or coverage data 156 may be passed to one or more accumulating stages or circuits 158 which may accumulate primitive and/or coverage information in one or more data storage structures 160 such as those described above with respect to the data accumulating structure 104. Examples of accumulating stages may include one or more hardware coverage reduction stages such as a coverage merging stage and/or an early coverage discard stage as described above with respect to the accumulating stage 102 in FIG. 1. Coverage 162 surviving after the one or more accumulating stages 158 may be passed to the pixel shader 152 for further processing.

In some embodiments, the one or more accumulating stages 158 may be the last stages that may remove coverage prior to executing the pixel shaders. Thus, in some implementations, an attribute setup control signal 164 may be used to provide feedback to the RASU stage 136 to indicate whether specific primitives have survived the final removal stage, i.e., whether they have any coverage remaining. If a primitive has any coverage, the RASU stage 136 may compute and/or store plane equations or barycentric factors for that primitive. Otherwise, the RASU stage may save time, energy, storage, and/or the like, by not performing calculations for primitives that have not survived.

In some embodiments, at some times during operation, the one or more accumulating stages 158 may hold a large number of primitives which may eventually be passed to the pixel shader 152 for further processing. However, for the pixel shader 152 to shade the primitives being stored in the one or more accumulating stages 158, the one or more interpolators 146 may need the attribute data associated with the vertices that were used to create the primitives. Thus, the attribute data associated with the vertices that were used to create the primitives being stored in the one or more accumulating stages 158 may need to be stored, for example, in one or more pipeline stages until the primitives are transferred to the pixel shader 152. This may take up a large amount of attribute storage in the pipeline.

Moreover, in some embodiments, and at some times during operation, many primitives and associated vertices may be in the pipeline upstream the one or more accumulating stages 158. These primitives and associated vertices may have additional attribute information that may need to be stored, for example, in one or more pipeline stages. In some situations, having a large number of attributes stored in one or more pipeline stages and/or accumulating stages may prevent one or more given stages from allowing primitives and/or control information to pass down to the rasterization stage. This, in turn, may prevent new coverage from the rasterization stage from pushing older coverage out of the one or more accumulating stages, and thus, pipeline lockup may occur.

The pipeline 120 illustrated in FIG. 4 may include a force drain logic module or circuit 166 which, in some circumstances, may avoid or mitigate pipeline lockup by forcing one or more of the accumulating stages 158 to drain some or all of its accumulated coverage and/or control information from the one or more data storage structures 160. In some embodiments, the force drain logic 166 may receive information from any number of the stages in the pipeline 120 which may become blocked or stalled, or which may contribute to, or help alleviate, a pipeline lockup condition. The force drain logic 166 may use this information to decide whether to drain accumulated data in the one or more accumulating stages.

In the embodiment illustrated in FIG. 4, each of the following components: FESCH logic 124, FESO logic stage 128, CCV stage 132, RASU 136, Rasterization stage 142, and depth test stage 144 may include a corresponding logic circuit 171, 172, 173, 174, 175, and 176, respectively, each of which may generate a corresponding set, 181, 182, 183, 184, 185, and 186, respectively, of one or more drain signals. A set of one or more drain signals may send any information that may help the force drain logic 166 decide whether to drain accumulated data in the one or more accumulating stages. For example, a set of drain signals may include a drain request signal that may be asserted to indicate that the corresponding component is or may be blocked, for example, from sending position information through the pipeline. In some embodiments, a drain request signal may be inexact, but may be implemented conservatively. As another example, a set of drain signals may include a status signal that may be asserted to indicate that the corresponding component is busy (e.g., performing work and/or making progress in transforming and/or propagating position information through the pipeline).

In some embodiments, the force drain logic 166 may simply force one or more accumulating stages 158 to drain some or all of its accumulated coverage by asserting a force drain signal 168 whenever one or more drain request signals from a pipeline stage or component is asserted. In some other embodiments, the force drain logic 166 may qualify a drain request from a pipeline stage or component with status information from another stage or component. For example, if one stage asserts a drain request signal indicating that the requesting stage is or may be blocked, the force drain logic 166 may only assert the force drain signal 168 if no subsequent stage has asserted a status signal indicating it is busy. In contrast, if any subsequent stage has asserted a status signal indicating it is busy, the force drain logic 166 may not assert the force drain signal 168. A busy stage, in this context, may mean that the stage has primitive or coverage work that can pass out of it to a later pipeline stage. This may mean that lockup may not happen unless a later stage blocks this work from reaching rasterization.

As a specific example, if the FESCH logic 124 is unable to send more position information down the pipeline because an internal queue is full of requests to push attributes to the next attribute pipeline stage, and the next pipeline stage is blocked by a full attribute pipeline at its output, then the FESCH logic 124 may assert its drain request signal to the force drain logic 166. However, the force drain logic 166 may not assert the force drain signal 168 if, for example, one or more primitives are in later stages of the pipeline that may pass down to the rasterization stage 142, or if the rasterization stage 142 has asserted a busy signal indicating that it is busy rasterizing one or more primitives.

In some embodiments, the force drain logic 166 may take additional information into consideration for determining whether to impose a force drain condition on the one or more accumulating stages 158. For example, if the output of the one or more accumulating stages 158 is blocked by a succeeding stage such as the pixel shader 152, there may be no reason to assert the force drain signal 168.

Accumulated coverage may be drained from the one or more data storage structures 160 in the one or more accumulating stages 158 in response to the force drain signal 168 in any suitable manner. For example, in some implementations, asserting the force drain signal 168 may cause the entire contents of the one or more data storage structures 160 to be dispatched to the pixel shader 152. In some other implementations, asserting the force drain signal 168 may cause one or more of the data storage structures 160 to drain a fixed number of entries per clock cycle as long as the force drain signal 168 is asserted.

In some embodiments, and depending on the implementation details, a lockup avoidance technique according to this disclosure may enable attribute storage and/or management in a graphics pipeline be tuned for improved and/or optimal energy and area consumption while making it possible to avoid pipeline lockup.

In some embodiments, and depending on the implementation details, a lockup avoidance technique according to this disclosure may require very little logic circuitry to implement.

In some embodiments, and depending on the implementation details, a lockup avoidance technique according to this disclosure may be realized in various implementations that may utilize state from varying numbers of stages.

Although the force drain logic 166 may be illustrated as centralized component in FIG. 4, in other embodiments, the structure and/or functions of may be distributed, for example, between different stages of the pipeline as illustrated in the embodiment of FIG. 2.

The implementation details shown in the embodiment of FIG. 4 are for illustrative purposes only, and any of the details may be changed according to the principles of this disclosure. For example, in other embodiments, some of the stages and/or components illustrated in FIG. 4 may be omitted, while other stages and/or components may be included. The order of the stages and/or components may be rearranged. Some of the stages may be combined or integrated into fewer stages, and/or the structure and/or functions of one stage may be split into separate stages. In some embodiments, fewer or more stages and/or components may include logic that may generate the one or more drain signals.

In some embodiments, the FESCH logic 124, FESO logic stage 128, CCV stage 132, RASU 136, rasterization stage 142, depth test stage 144, and/or one or more accumulating stages 158 may be implemented primarily as hardware. Such hardware may include fixed function circuitry and/or circuitry that may have programmable characteristics such as a field programmable gate array (FPGA), a complex programmable logic device (CPLD), and/or the like. In some embodiments, such hardware may also include circuitry that may execute a sequence of programmable actions encapsulated within a hardware module.

In some embodiments, a graphics pipeline may be implemented with a combination of hardware and software. For example, one or more of the stages and/or other components may be implemented in software while the remainder may be implemented in hardware. For example, in some embodiments, a graphics pipeline may have one or more stages implemented in hardware and accessible to an application through an application programming interface (API), for example, through one or more device drivers. In such an embodiment, one or more pipeline stages may be implemented in software that may be called or otherwise accessed through the one or more device drivers.

Figure 5:
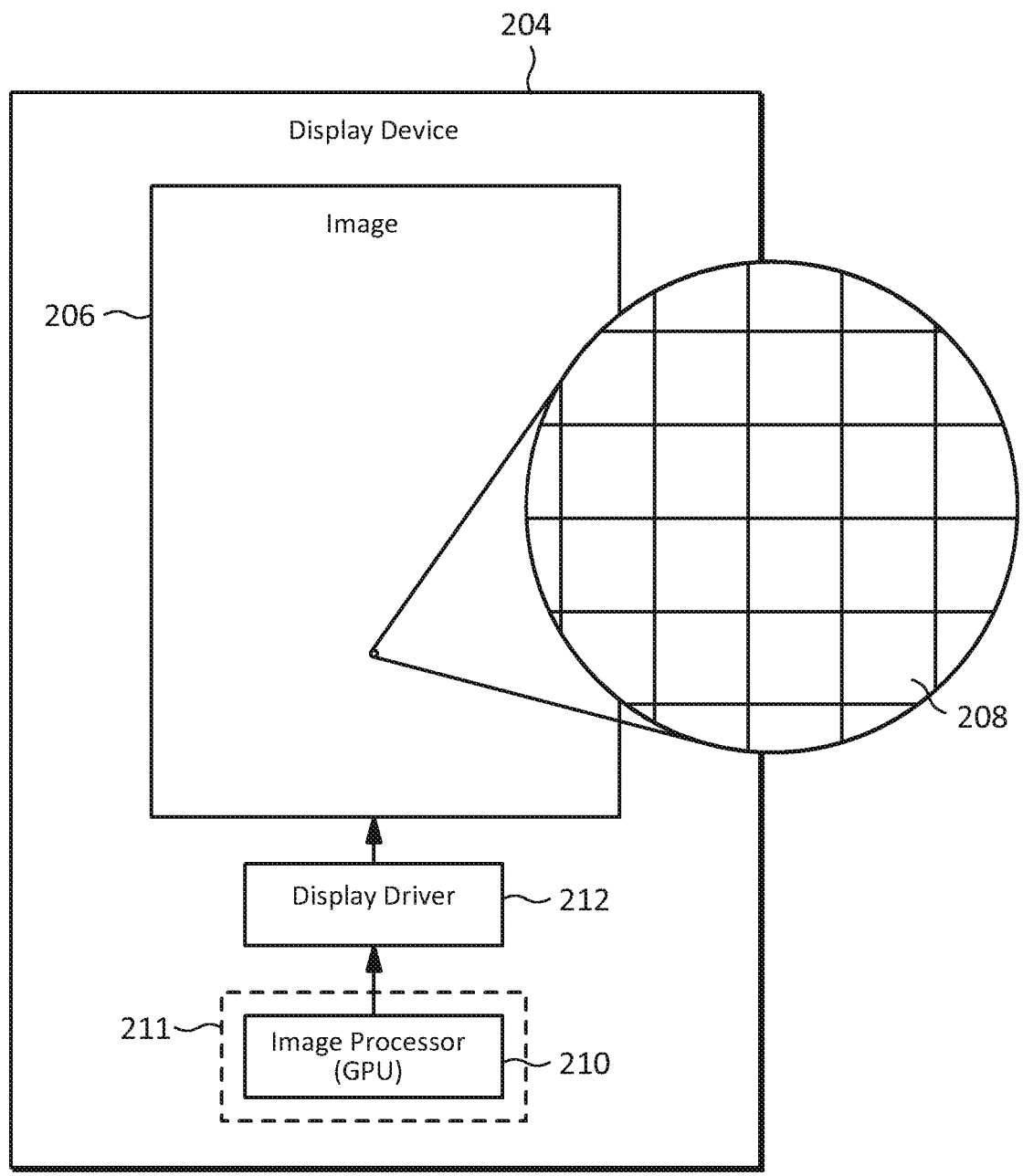
FIG. 5 illustrates an embodiment of an imaging device into which any of the methods or apparatus described in this disclosure may be integrated.

FIG. 5 illustrates an embodiment of an imaging device 204 into which any of the methods or apparatus described in this disclosure may be integrated. The display device 204 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 206 with pixels. An image processor 210 may be implemented with a graphics processing unit (GPU) which may include a graphics pipeline that may implement a lockup avoidance technique according to this disclosure. A display driver circuit 212 may process and/or convert the image to a form that may be displayed on or through the imaging device 204. A portion of the image 206 is shown enlarged so pixels 208 are visible. Any of the methods or apparatus described in this disclosure may be implemented in the image processor 210 which may be fabricated on an integrated circuit 211. In some embodiments, the integrated circuit 211 may also include the display driver circuit 212 and/or any other components that may implement any other functionality of the display device 204.

The embodiments disclosed herein may be described in the context of various implementation details, but the principles of this disclosure are not limited these or any other specific details. Some functionality has been described as being implemented by certain components, but in other embodiments, the functionality may be distributed between different systems and components in different locations and having various user interfaces. In some embodiments, components described as being coupled together may be coupled together through another component. In some embodiments, information that may be described as being passed from a first component to a second component may be passed through a third component. Certain embodiments have been described as having specific processes, steps, combinations thereof, and/or the like, but these terms may also encompass embodiments in which a specific process, step, combinations thereof, and/or the like may be implemented with multiple processes, steps, combinations thereof, and/or the like, or in which multiple process, steps, combinations thereof, and/or the like may be integrated into a single process, step, combinations thereof, and/or the like. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method for avoiding lockup in a graphics pipeline, the method comprising:
   accumulating first position information in an accumulating stage of the pipeline;
   passing second position information from a first preceding stage of the pipeline to the accumulating stage;
   determining a condition in the first preceding stage;
   asserting a signal based on the condition of the first preceding stage; and
   draining at least a portion of the first position information from the accumulating stage based on the signal.

2. The method of claim 1, wherein the condition in the first preceding stage comprises a blocked condition.

3. The method of claim 1, further comprising:
   passing third position information from a second preceding stage to the first preceding stage of the pipeline;
   determining a condition in the second preceding stage; and
   draining at least a portion of the first position information from the accumulating stage in response to the condition in the first preceding stage and the condition in the second preceding stage.

4. The method of claim 3, wherein:
   the condition in the first preceding stage comprises a blocked condition; and
   the condition in the second preceding stage comprises a not busy condition.

5. The method of claim 4, wherein:
   the second preceding stage comprises a position information culling stage; and
   the first preceding stage comprises a rasterization stage.

6. The method of claim 3, wherein a decision to drain the first position information from the accumulating stage is centralized based on information from the first and second preceding stages.

7. The method of claim 3, wherein a decision to drain the first position information from the accumulating stage is distributed between the first and second preceding stages.

8. The method of claim 1, wherein the accumulating stage comprises one of a coverage merge stage or a coverage discard stage.

9. The method of claim 1, wherein the first position information comprises at least one of rasterization coverage, a primitive, a vertex, or control information.

10. The method of claim 1, wherein the first preceding stage comprises one of a front end output storage buffer, a front end shader output logic stage, a clip cull viewport stage, a rasterization setup stage, or an attribute setup stage.

11. An apparatus comprising a graphics pipeline comprising:
    an accumulating stage configured to accumulate first position information;
    a first preceding stage configured to send second position information to the accumulating stage; and
    force drain logic configured to determine a condition in the first preceding stage and assert a signal based on the condition of the first preceding stage, wherein the force drain logic is further configured to force the accumulating stage to drain at least a portion of the first position information based on the signal.

12. The apparatus of claim 11, wherein the condition in the first preceding stage comprises a blocked condition.

13. The apparatus of claim 11, wherein:
    the pipeline further comprises a second preceding stage configured to send third position information to the first preceding stage; and
    the force drain logic is configured to determine a condition in the second preceding stage and force the accumulating stage to drain at least a portion of the first position information in response to the condition in the first preceding stage and the condition in the second preceding stage.

14. The apparatus of claim 13, wherein:
    the condition in the first preceding stage comprises a blocked condition; and
    the condition in the second preceding stage comprises a not busy condition.

15. The apparatus of claim 14, wherein:
    the first preceding stage comprises a position information culling stage; and
    the second preceding stage comprises a rasterization stage.

16. An apparatus comprising a graphics pipeline comprising:
    a rasterization circuit;
    an accumulating circuit coupled to the rasterization circuit, wherein the accumulating circuit is capable of accumulating coverage received from the rasterization circuit and draining at least a portion of the coverage in response to a force drain signal;
    an upstream circuit coupled to the rasterization circuit to send position information to the rasterization circuit; and
    a force drain circuit coupled to the rasterization circuit, the accumulating circuit, and the upstream circuit, wherein the force drain circuit is capable of generating the force drain signal in response to a drain request signal from the upstream circuit and a status signal from the rasterizer circuit.

17. The apparatus of claim 16, wherein the force drain circuit asserts the force drain signal in response to the upstream circuit asserting the drain request signal and the status signal indicating the rasterization circuit is not busy.

18. The apparatus of claim 16, wherein at least a portion of the force drain circuit is integral with at least one of the upstream circuit or the rasterization circuit.

19. The apparatus of claim 16, wherein the accumulating circuit comprises one of a coverage merge circuit or a coverage discard circuit.

20. The apparatus of claim 16, wherein the upstream circuit comprises one of a front end output storage buffer, a front end shader output logic stage, a clip cull viewport stage, a rasterization setup stage, or an attribute setup stage.

* * * * *